(12) United States Patent
Sakurada et al.

(10) Patent No.: US 10,856,104 B2
(45) Date of Patent: Dec. 1, 2020

(54) INFORMATION PROVIDING SYSTEM, SERVER, ONBOARD DEVICE, AND INFORMATION PROVIDING METHOD

(71) Applicant: TOYOTA JIDOSHA KABUSHIKI KAISHA, Toyota (JP)

(72) Inventors: Shin Sakurada, Toyota (JP); Jun Okamoto, Nagoya (JP); Josuke Yamane, Nissin (JP); Risako Yamamoto, Toyota (JP); Kazuki Sugie, Toyota (JP); Masatoshi Komiyama, Handa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/571,600

(22) Filed: Sep. 16, 2019

(65) Prior Publication Data
US 2020/0178024 A1 Jun. 4, 2020

(30) Foreign Application Priority Data
Nov. 29, 2018 (JP) ................. 2018-224118

(51) Int. Cl.
*H04W 4/021* (2018.01)
*H04W 4/44* (2018.01)
(Continued)

(52) U.S. Cl.
CPC ............ *H04W 4/021* (2013.01); *G07C 5/008* (2013.01); *G08G 1/096827* (2013.01); *G08G 1/096838* (2013.01); *H04W 4/44* (2018.02)

(58) Field of Classification Search
CPC .. H04W 4/021; H04W 4/44; G08G 1/096827; G08G 1/096838; G07C 5/008
See application file for complete search history.

(56) References Cited

U.S. PATENT DOCUMENTS 9,909,890 B2 * 3/2018 Bulpitt ............... G01C 21/3469
2006/0080030 A1 * 4/2006 Okude .................. G01C 21/32
701/452

(Continued)

FOREIGN PATENT DOCUMENTS

JP     2008-165652 A    7/2008

*Primary Examiner* — Nizar N Sivji
(74) *Attorney, Agent, or Firm* — Oblon, McClelland, Maier & Neustadt, L.L.P.

(57) ABSTRACT

An information providing system includes an onboard device and a server configured to transmit and receive information to and from the onboard device. The onboard device includes: one or more first processors configured to acquire a current position and an output mode and to transmit the acquired current position and the acquired output mode to the server; and an output interface configured to output power source station recommendation information received. The server includes: one or more memories configured to store power source station information including position information of a power source station and a power source price detected from a captured image of the power source station; and one or more second processors configured to prioritize power source stations located within a predetermined range from the current position based on the output mode and to provide power source station information of the prioritized power source stations to the onboard device.

17 Claims, 10 Drawing Sheets

(51) Int. Cl.
 *G07C 5/00* (2006.01)
 *G08G 1/0968* (2006.01)

(56) References Cited

U.S. PATENT DOCUMENTS

| | | | | |
|---|---|---|---|---|
| 2008/0080682 | A1* | 4/2008 | Ogunwale | G06Q 30/02 379/93.17 |
| 2010/0114478 | A1* | 5/2010 | Bai | G01C 21/32 701/408 |
| 2014/0278056 | A1* | 9/2014 | Williams | G01C 21/3476 701/410 |
| 2015/0106204 | A1* | 4/2015 | Pudar | G06Q 30/0261 705/14.58 |
| 2016/0116292 | A1* | 4/2016 | An | G01C 21/26 701/454 |
| 2017/0362076 | A1* | 12/2017 | Hall | H04W 4/029 |
| 2018/0286245 | A1* | 10/2018 | Obaidi | G07C 5/008 |

* cited by examiner

SERVICE STATION INFORMATION 23

| SERVICE STATION ID | SERVICE STATION POSITION | ... |
|---|---|---|

FUEL PRICE INFORMATION

| FUEL TYPE 1 | FUEL PRICE 1 | FUEL TYPE 2 | FUEL PRICE 2 | FUEL TYPE 3 | FUEL PRICE 3 | ... | DISCOUNT CONDITION | DISCOUNTED PRICE |
|---|---|---|---|---|---|---|---|---|

AVAILABILITY INFORMATION

| IMAGING TIME | AVAILABILITY | ... |
|---|---|---|

INFORMATION PROVIDING SYSTEM, SERVER, ONBOARD DEVICE, AND INFORMATION PROVIDING METHOD

INCORPORATION BY REFERENCE

The disclosure of Japanese Patent Application No. 2018-224118 filed on Nov. 29, 2018 including the specification, drawings and abstract is incorporated herein by reference in its entirety.

BACKGROUND

1. Technical Field

The present disclosure relates to an information providing system, a server, an onboard device, and an information providing method.

2. Description of Related Art

A navigation device that supports driving of a vehicle provides a user with various types of information as well as guidance for a route to a destination. For example, Japanese Unexamined Patent Application Publication No. 2008-165652 (JP 2008-165652 A) discloses a navigation device that stores gasoline price information of service stations in a server and provides a user with gasoline price information received from the server along with positions of service stations.

SUMMARY

In the technique disclosed in JP 2008-165652 A, a service station is imaged by an imaging unit which is provided in the navigation device, captured image data is stored in the server, and gasoline price information is detected and stored using image recognition by the server. Then, the gasoline price information is transmitted from the server to the navigation device and the gasoline price information is presented by the navigation device.

However, in the method of presenting price information of a power source such as gasoline in the related art, there is room for improvement in view of convenience for a user. Therefore, the disclosure provides a system that provides power source price information or the like.

According to an aspect of the present disclosure, there is provided an information providing system including an onboard device, and a server that transmits information to and receives information from the onboard device. The onboard device includes: one or more first processors configured to acquire a current position and an output mode and to transmit the acquired current position and the acquired output mode to the server; and an output interface configured to output power source station recommendation information which is received from the server. The server includes: one or more memories configured to store power source station information including position information of a power source station and a power source price which is detected from a captured image of the power source station; and one or more second processors configured to prioritize power source stations which are located within a predetermined range from the current position based on the output mode and to provide power source station information of the prioritized power source stations as the power source station recommendation information to the onboard device.

According to another aspect of the present disclosure, there is provided a server including: one or more communication modules configured to transmit information to and receive information from an onboard device or a mobile terminal; one or more processors configured to acquire captured image data which is transmitted from the onboard device or the mobile terminal and position information corresponding to the captured image data, to detect a power source price from the captured image data, generate power source station information including the power source price and the position information, acquire a current position and an output mode which are transmitted from the onboard device, prioritize power source stations which are located within a predetermined range from the current position based on the output mode, and provide the power source station information of the prioritized power source stations as power source station recommendation information to the onboard device.

According to still another aspect of the present disclosure, there is provided an information providing method which is performed by an onboard device and a server configured to transmit information to and receive information from the onboard device, the information providing method including: storing, by the server, power source station information including position information of power source stations and power source prices which are detected from captured images of the power source stations; acquiring, by the onboard device, a current position and an output mode and to transmit the acquired current position and the acquired output mode to the server; prioritizing, by the server, power source stations which are located within a predetermined range from the current position based on the output mode and to provide power source station information of the prioritized power source stations as power source station recommendation information to the onboard device; and outputting, by the onboard device, the power source station recommendation information which is received from the server.

With the information providing system according to the present disclosure, it is possible to provide a system that provides power source price information that contributes to convenience for a user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

Figure 1:
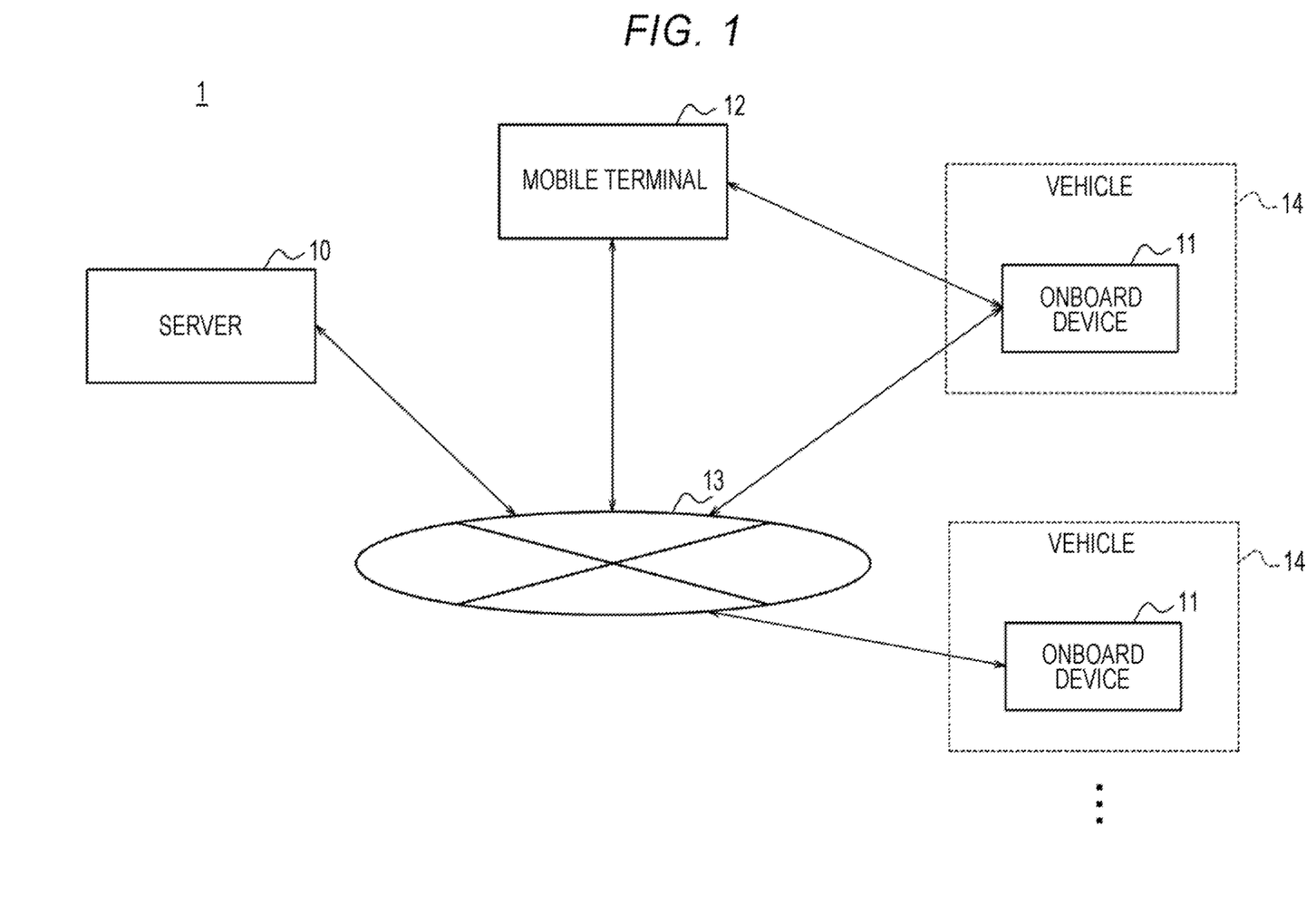
FIG. 1 is a diagram illustrating a configuration of an information providing system.

FIG. 1 is a diagram illustrating a configuration of an information providing system 1 according to an embodiment. The information providing system 1 includes a server 10 and an onboard device 11 which is mounted in a vehicle 14. The vehicle 14 is, for example, an automobile but is not limited thereto and may be an arbitrary vehicle which a user can board. The onboard device 11 has one or both of a navigation function and an imaging function. The server 10 and the onboard device 11 are connected to transmit data to and receive data from each other via a network 13 in a wired or wireless manner. The information providing system 1 may include a plurality of onboard devices 11 which is mounted in a plurality of vehicles 14. The onboard device 11 is connected to a mobile terminal 12 which is carried by a user to transmit data to and receive data from the mobile terminal 12 in a wired or wireless manner. In this configuration, the server 10, the onboard device 11, and the mobile terminal 12 transmit a variety of information to and receive a variety of information from each other.

The vehicle 14 travels by acquiring power from various power sources. Examples of a power source include petroleum fuel such as gasoline, electric power which is charged to a battery, and hydrogen fuel for driving a fuel cell. When the power source is consumed by traveling, the vehicle 14 replenishes a power source in a power source station. At this time, a user purchases a power source by paying a charge corresponding to a power source price in the power source station. In this embodiment, the vehicle 14 acquires power to travel by causing an internal combustion engine to combust a power source with petroleum fuel such as gasoline as the power source. The vehicle 14 is supplied with a power source which is required for traveling, that is, petroleum fuel, in a service station serving as the power source station. At this time, a user purchases petroleum fuel by paying a charge corresponding to a power source price, that is, a fuel price. In this configuration, when the vehicle 14 having the onboard device 11 mounted therein travels in the vicinity of a service station, the onboard device 11 recognizes a position of the service station using the navigation function, images the service station using the imaging function, and transmits position information and captured image data of the service station to the server 10. Then, the server 10 detects fuel price information ("power source price information") of the service station from the captured image and stores the detected fuel price information along with the position information thereof. On the other hand, when the onboard device 11 performs guidance for a route to a destination using the navigation function, the onboard device 11 acquires service station information ("power source station information") including fuel prices and positions of service stations in the vicinity of a travel route from the server 10 and presents service station recommendation information ("power source station recommendation information") to a user in accordance with the order of priority in a mode which is set by the user. According to this configuration, it is possible to collect information of service stations which can be imaged within a range in which the vehicle 14 (preferably a plurality of vehicles 14) travels and to comprehensively provide a user with information of the service stations in a whole system. Since service stations can be recommended to a user in the order of priority desired by the user, it is possible to improve convenience for a user.

Figure 2:
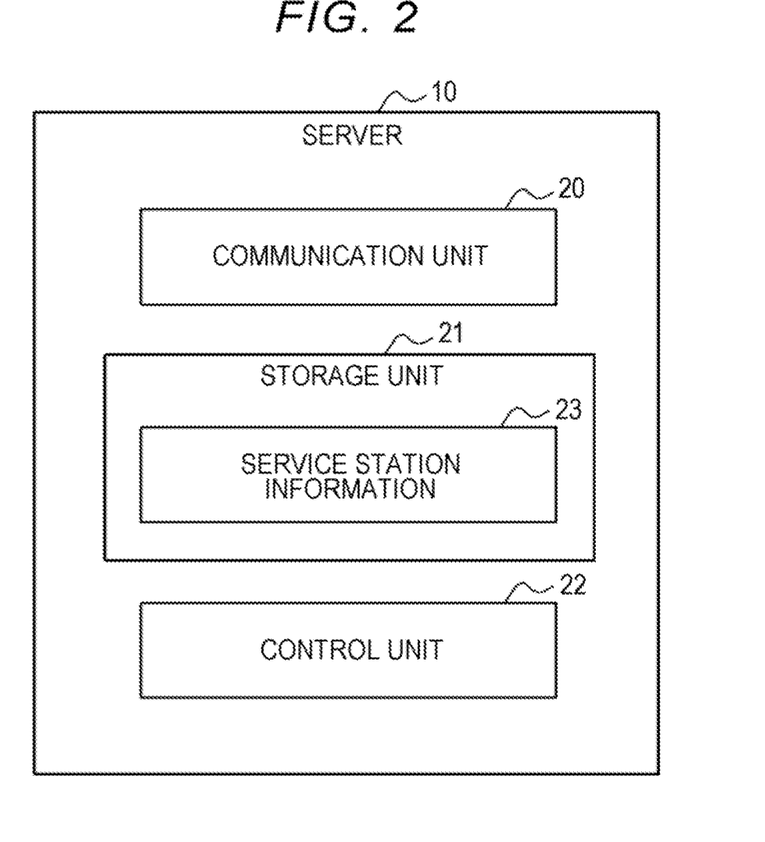
FIG. 2 is a diagram illustrating a configuration of a server.

FIG. 2 illustrates the configuration of the server 10. The server 10 includes a communication unit 20, a storage unit 21, and a control unit 22. The server 10 is a single computer or a plurality of computers that can communicate with each other.

The communication unit 20 includes one or more communication modules that are connected to the network 13. For example, the communication unit 20 may include a communication module corresponding to a local area network (LAN) standard. In this embodiment, the server 10 is connected to the network 13 via the communication unit 20.

The storage unit 21 includes one or more memories. Each memory included in the storage unit 21 may function as, for example, a main storage device, an auxiliary storage device, or a cache storage device. The storage unit 21 stores arbitrary information, a control processing program, and a database which are used for operation of the server 10. The storage unit 21 stores, for example, service station information 23. The service station information 23 will be described later.

The control unit 22 includes one or more processors. Each processor is a general-purpose processor or a dedicated processor specialized in a specific process but is not limited thereto. The control unit 22 controls the operation of the server 10 in accordance with a control processing program which is stored in the storage unit 21. The control unit 22 also has a clocking function that acquires a current time.

Figure 3:
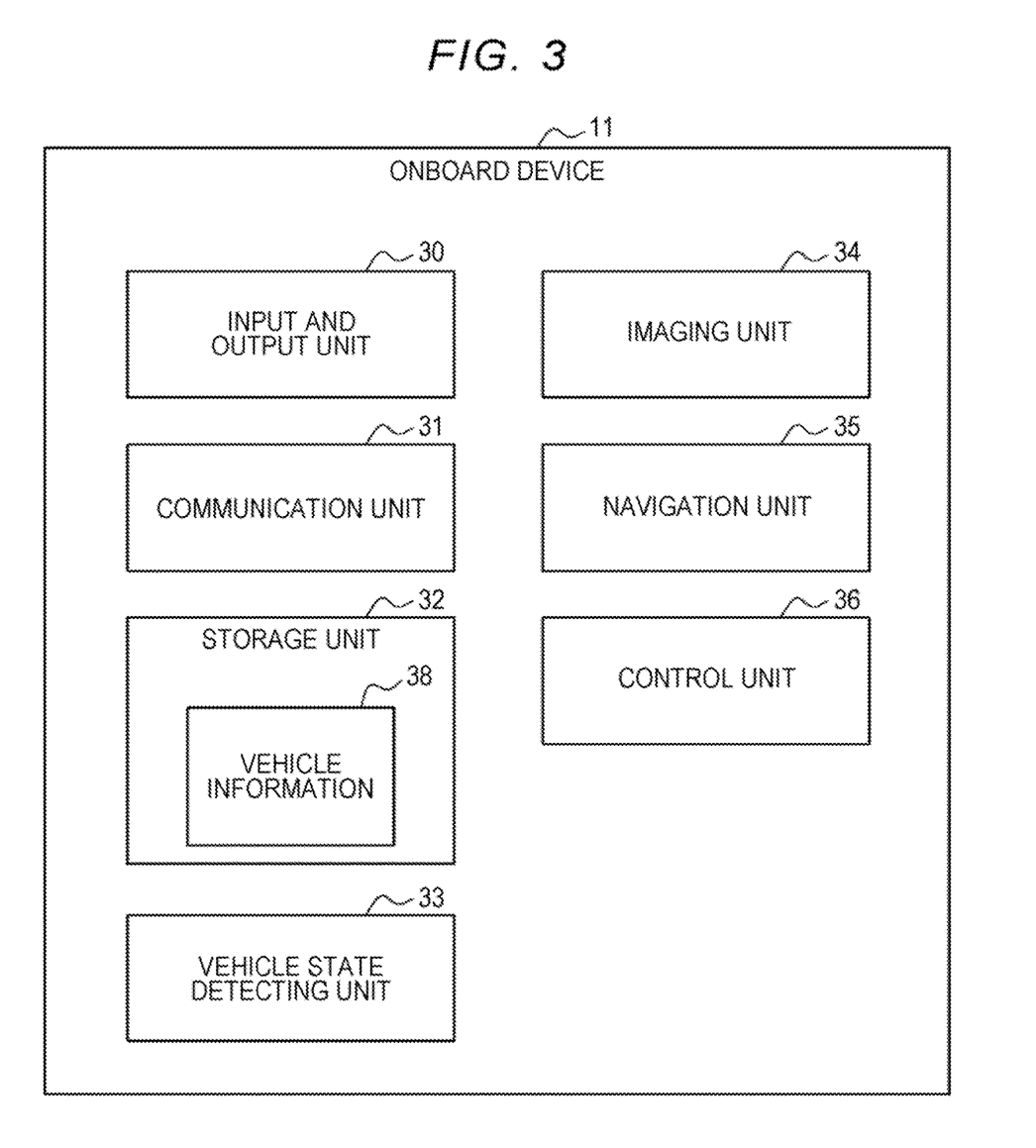
FIG. 3 is a diagram illustrating a configuration of an onboard device.

FIG. 3 illustrates the configuration of the onboard device 11. The onboard device 11 includes an input and output unit 30, a communication unit 31, a storage unit 32, a vehicle state detecting unit 33, an imaging unit 34, a navigation unit 35, and a control unit 36.

The input and output unit 30 includes an input interface that detects a user's input and supplies input information to the navigation unit 35, the control unit 36, and the like. The input interface includes, for example, physical keys, capacitive keys, a touch screen that is provided integrally with a panel display, or a microphone that receives a sound input, but is not limited thereto and may be an arbitrary input interface. The input and output unit 30 includes an output interface that outputs information, which is generated by the navigation unit 35 or the control unit 36 or acquired from the server 10, to a user. The output interface includes, for example, a panel display that outputs information as a still image or a moving image, a head-up display, or a speaker that outputs information as sound, but is not limited thereto and may be an arbitrary output interface.

The communication unit 31 includes one or more communication modules. For example, each communication module may include a module corresponding to a mobile communication standard such as 4th generation (4G) and 5th generation (5G). The communication unit 31 may include a communication device such as a data communication module (DCM). The onboard device 11 is connected to the network 13 via the communication unit 31 and performs data communication with the server 10. The communication module includes, for example, a module corresponding to a short-range radio communication standard such as Bluetooth (registered trademark), a wired local area network (LAN) standard, or a wireless LAN standard. The onboard device 11 performs data communication with the mobile terminal 12 via the communication unit 31. The communication module includes a global positioning system (GPS) receiver module. The onboard device 11 receives GPS signals through the communication unit 31.

The storage unit 32 includes one or more memories. Each memory included in the storage unit 32 may be, for example, a semiconductor memory, a magnetic memory, or an optical memory, but is not limited thereto. Each memory may serve as, for example, a main storage device, an auxiliary storage device, or a cache storage device. The storage unit 32 stores arbitrary information which is used for operation of the onboard device 11. For example, the storage unit 32 may store a control processing program and embedded software. For example, vehicle information 38 of the vehicle 14 in which the onboard device 11 is mounted is stored in the storage unit 32. The vehicle information 38 includes a manufacturer, a model, and a year model. The vehicle information 38 is input via the input and output unit 30 and is stored in the storage unit 32, for example, when the onboard device 11 is mounted in the vehicle 14.

The vehicle state detecting unit 33 includes, for example, various sensors that detect a fuel (power source) residual, a vehicle speed, acceleration, a steering angle, and yaw rate. The vehicle state detecting unit 33 detects various vehicle states at predetermined intervals. Information on various vehicle states which are detected by the vehicle state detecting unit 33 are supplied to the navigation unit 35 and the control unit 36 at predetermined intervals.

The imaging unit 34 realizes an imaging function of the onboard device 11. The imaging unit 34 includes one or more cameras that image scenes or subjects in front in the travel direction of the vehicle 14, in lateral directions of the vehicle 14, and behind the vehicle 14. Each camera of the imaging unit 34 may be a monocular camera or a stereoscopic camera. The imaging unit 34 captures an image of a scene or a subject outside the vehicle, generates captured image data, and supplies the generated captured image data to the control unit 36.

The navigation unit 35 realizes the navigation function of the onboard device 11. The navigation unit 35 includes one or more processors that perform processes associated with route guidance. The navigation unit 35 acquires map information from the storage unit 32, acquires a user's input information from the input and output unit 30, or acquires a user's schedule information which is transmitted by the mobile terminal 12 from the communication unit 31. The navigation unit 35 acquires a current position (for example, latitude and longitude) of the vehicle 14 which is detected by the control unit 36 from the control unit 36. The navigation unit 35 presents information for route guidance to a user through the input and output unit 30 based on the user's input information, the schedule information, the current position, and the like. The navigation unit 35 acquires service station recommendation information from the server 10 via the communication unit 31 and presents the acquired service station recommendation information to a user via the input and output unit 30.

The control unit 36 includes one or more processors. Each processor is a general-purpose processor or a dedicated processor specialized in a specific process but is not limited thereto. For example, an electronic control unit (ECU) which is mounted in the vehicle 14 may function as the control unit 36. The control unit 36 comprehensively controls the operation of the onboard device 11. The control unit 36 also has a clocking function that acquires a current time.

Figure 4:
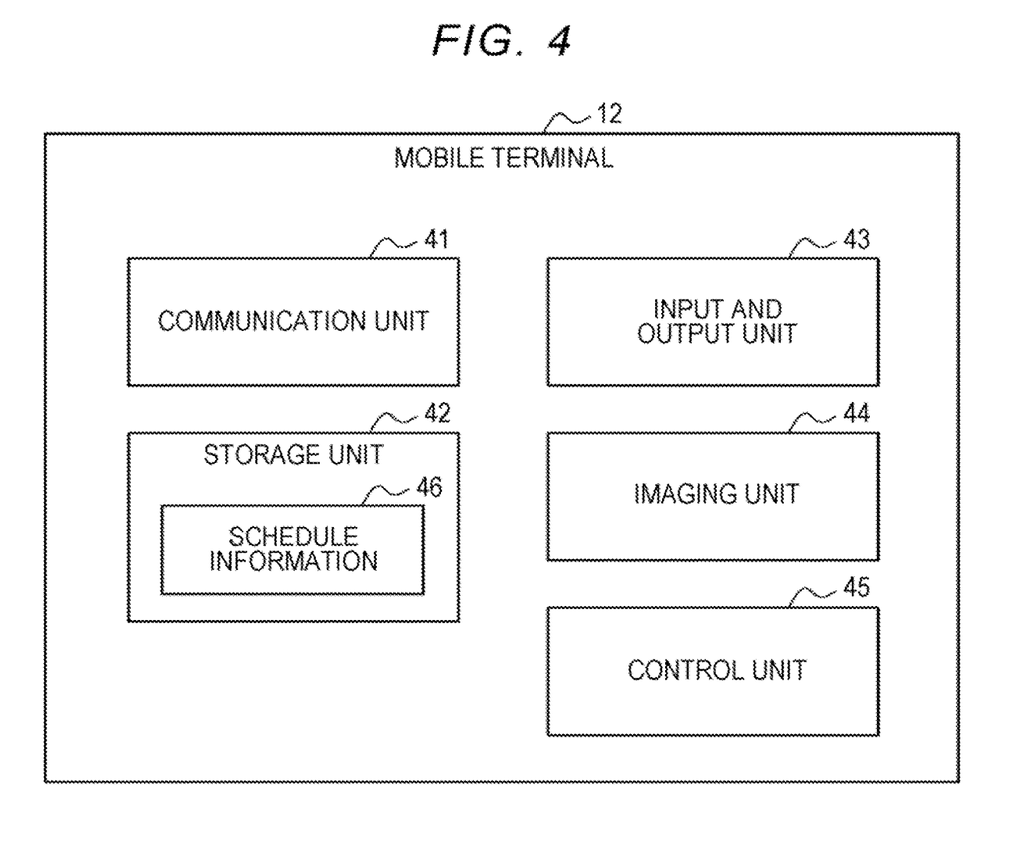
FIG. 4 is a diagram illustrating a configuration of a mobile terminal.

FIG. 4 illustrates the configuration of the mobile terminal 12. The mobile terminal 12 includes a communication unit 41, a storage unit 42, an input and output unit 43, an imaging unit 44, and a control unit 45. The mobile terminal 12 is a portable electronic device such as a smartphone or a tablet.

The communication unit 41 includes one or more communication modules that are connected to the network 13. For example, each communication module may include a module corresponding to a mobile communication standard such as 4th generation (4G) and 5th generation (5G). The mobile terminal 12 is connected to the network 13 via the communication unit 41. The communication module includes a GPS receiver module. The mobile terminal 12 receives GPS signals through the communication unit 41.

The storage unit 42 includes one or more memories. Each memory is, for example, a semiconductor memory, but is not limited thereto. Each memory may serve as, for example, a main storage device, an auxiliary storage device, or a cache storage device. The storage unit 42 stores arbitrary information associated with a control processing operation of the mobile terminal 12. The storage unit 42 stores schedule information 46 corresponding to a behavior schedule which is input by a user.

The input and output unit 43 includes an input interface that detects a user's input and supplies input information to the control unit 45. The input interface includes, for example, physical keys, capacitive keys, a touch screen that is provided integrally with a panel display, or a microphone that receives a sound input, but is not limited thereto and may be an arbitrary input interface. The input and output unit 43 includes an output interface that outputs information, which is generated by the control unit 45 or read from the storage unit 42, to a user. The output interface includes, for example, a panel display that outputs information as a still image or a moving image or a speaker that outputs information as sound, but is not limited thereto and may be an arbitrary output interface.

The imaging unit 44 includes one or more cameras. Each camera may be a monocular camera or a stereoscopic camera. The imaging unit 44 captures an image of a scene or a subject in response to a user's operation and generates captured image data.

The control unit 45 includes one or more processors. Each processor is a general-purpose processor or a dedicated processor specialized in a specific process but is not limited thereto. The control unit 45 controls the operation of the mobile terminal 12 in accordance with a control processing program which is stored in the storage unit 42 and executes various application programs.

The operation of the information providing system 1 according to this embodiment will be described below.

Figure 5:
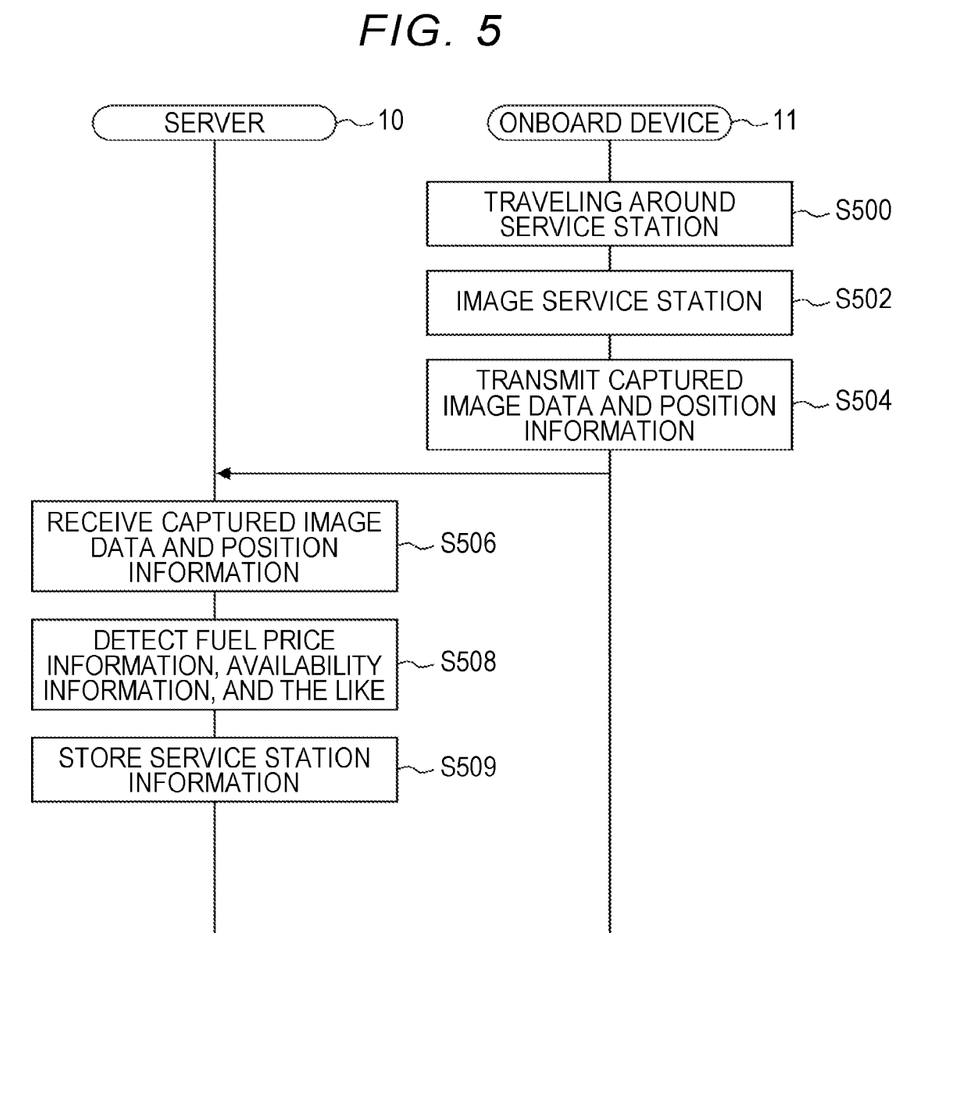
FIG. 5 is a sequence diagram illustrating operations of the information providing system.

FIG. 5 is a sequence diagram illustrating the operation of the information providing system 1 when service station information is detected from a captured image. The sequence illustrated in FIG. 5 is performed at predetermined intervals (for example, every several seconds to several tens of seconds) while the vehicle 14 in which the onboard device 11 is mounted is traveling.

When it is detected that the vehicle 14 is located in the vicinity of a service station while the vehicle 14 is traveling (operation S500), the onboard device 11 captures an image of the service station (operation S502) and transmits captured image data and position information of the imaged service station to the server 10 (operation S504). In the onboard device 11, the units that perform operations S502, S503, and S504 correspond to an "imaging control unit."

In the onboard device 11, for example, when it is detected that the vehicle 14 is located within a predetermined distance (for example, 10 m to 20 m) from a service station on a map based on the current position and the map information, the navigation unit 35 supplies a notification indicating that fact along with position information (for example, latitude and longitude) of the service station to the control unit 36. Then, in response to this notification, the control unit 36 instructs the imaging unit 34 to capture an image and the imaging unit 34 images a scene or a subject outside the vehicle. At this time, a scene or a subject outside the vehicle may include a service station and a fuel price indication. The control unit 36 acquires captured image data from the imaging unit 34 and transmits the captured image data along with the position information of the service station to the server 10 via the communication unit 31. At this time, the control unit 36 may acquire GPS signals from the communication unit 31, detect the current position of the vehicle 14 at the time of imaging from the GPS signals, and transmit the detected position information along with the captured image data to the server 10.

Subsequently, when the captured image data and the position information are received (operation S506), the server 10 detects fuel price information, availability information, and the like from the captured image (operation S508), and stores the detected information as service station information 23 in the storage unit 21 (operation S509). In the server 10, the units that perform operations S506, S508, and S509 correspond to a "power source station information generating unit." In this way, by allowing a plurality of vehicles 14 to travel as desired by users thereof, service station information on service stations within the traveling range of the vehicle 14 can be accumulated in the server 10.

In the server 10, for example, the control unit 22 identifies and extracts character information from the captured image. Then, the control unit 22 performs a character recognition process on the extracted character information and extracts the fuel price information. The fuel price information includes a fuel type, a fuel price, discount conditions, and a discount quantity. The fuel type is a type such as "high octane," "premium," "regular," "light oil," or "diesel." The fuel price is, for example, the price per liter. The discount conditions include a day and a date on which discount is applied and a type and a name of points which are given or returned. The discount quantity is, for example, a discount quantity, an amount of returned money, or points which are given or returned.

Here, the fuel price may be expressed in different expressions such as "1 liter 140 yen," "140 yen/liter," and simply "140 yen" depending on the service stations. Therefore, for example, table data for converting different expressions patterns into a consistent rate (for example, "yen/liter") is stored in the storage unit 21 in advance. With reference to the table data, the control unit 22 converts the recognized fuel price into a consistent rate and stores the converted rate as a part of the fuel price information in the storage unit 21. Therefore, fuel prices of service stations can be easily compared.

Description patterns of discount conditions are various such as "O-day," "date including 5," "date including 0," and "return of 00 points." Therefore, for example, a database in which the description patterns of discount conditions are correlated with days, dates, types and names of points, and the like which are classified in advance is stored in the storage unit 21. With reference to the database, the control unit 22 converts the recognized discount conditions into predetermined classifications of discount conditions and stores the converted discount conditions as a part of the fuel price information in the storage unit 21.

The discount quantity may be displayed in modes such as an amount of discount money, an amount of returned money, and points which are given or returned. The points which are given or returned may have different conversion rates into an amount of money depending on the types of points. Accordingly, for example, table data for conversion into an amount of money in a predetermined unit for each description pattern of an amount of discount money and conversion rates corresponding to the types of points are stored in the storage unit 21. The control unit 22 converts the recognized amount of discount money into an amount of discount money in a predetermined unit using the table data or the conversion rates and stores the converted amount of money as a part of the fuel price information in the storage unit 21. Accordingly, the amounts of discount money in the service stations can be easily compared.

The control unit 22 may extract availability information of a service station by performing a pattern recognition process on a captured image. The availability information includes an imaging time and availability at the imaging time. For example, the control unit 22 identifies an image of vehicles which are being fueled and which wait for fueling from a background image of a service station. Then, the control unit 22 determines availability in each service station, for example, based on an area ratio between the background image and the vehicle image in the whole captured image. For example, as the area ratio of the vehicle image becomes greater, availability is determined to be less (or zero). The availability is determined in several steps such as "there is much availability," "there is little availability," and "there is no availability."

Figure 6:
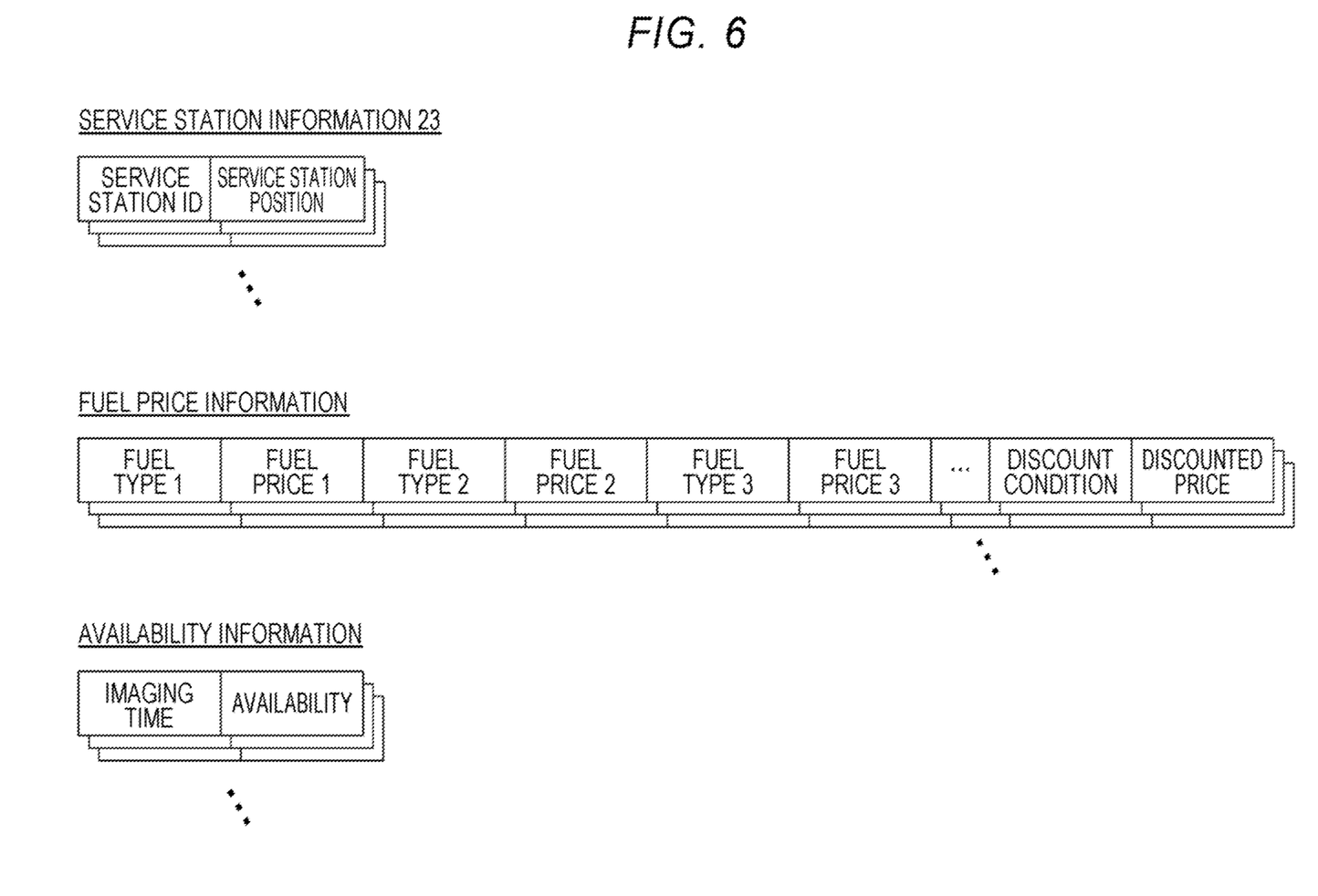
FIG. 6 is a diagram illustrating service station information.

FIG. 6 illustrates service station information 23 which is stored in the storage unit 21. The service station information 23 includes, for example, a service station ID, a service station position, fuel price information, and availability information for each of a plurality of service stations. The fuel price information includes fuel type_n (where n is a natural number) and fuel price_n, discount conditions, and a discount quantity corresponding to the fuel type_n. For example, fuel type_1 is "high octane," fuel type_2 is "regular," fuel type_3 is "light oil." The availability information includes an imaging time and availability. The service station ID is uniquely added by the control unit 22 when the service station information is stored in the storage unit 21.

Figure 7:
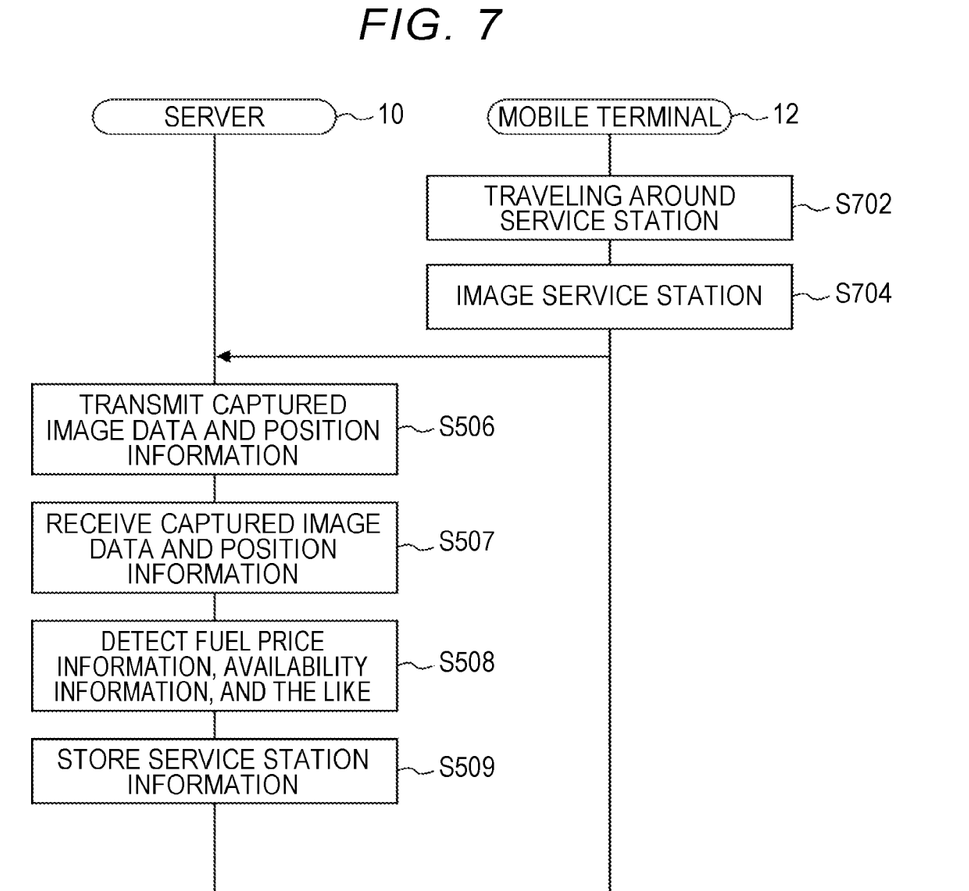
FIG. 7 is a sequence diagram illustrating operations of the information providing system.

FIG. 7 illustrates a modified example of the sequence illustrated in FIG. 5. Operations S506, S508, and S509 which are performed by the server 10 are the same as illustrated in FIG. 5. Here, imaging of a service station is performed by the mobile terminal 12 instead of the onboard device 11. For example, when a user passes through the vicinity of a service station while the user is traveling in a vehicle 14 or is moving without using a vehicle 14, the user arbitrarily images a service station with the mobile terminal 12 (operation S702). Then, the mobile terminal 12 transmits captured image data and position information of the imaged service station to the server 10 (operation S704).

In the mobile terminal 12, the control unit 45 causes the imaging unit 44 to capture an image, for example, in response to a user's operation input to the input and output unit 43. The control unit 45 acquires GPS signals via the communication unit 41 and detects a current position. Then, the control unit 45 acquires captured image data from the imaging unit 44 and transmits the captured image data along with the position information to the server 10 via the communication unit 41. Instead of a user who arbitrarily images a service station, the mobile terminal 12 may prompt a user to capture an image. For example, the control unit 45 may periodically detect the current position from the GPS signals, compare the current position with map information stored in the storage unit 42, and output a notification for prompting a user to capture an image via the input and output unit 43 when it is detected that the user is located within a predetermined distance (for example, 5 m to 10 m) from the service station on the map.

Subsequently, when the captured image data and the position information are received (operation S506), the server 10 compares the map information stored in the storage unit 21 with the received position information, checks whether a position at which the imaging has been performed matches a location of the service station on the map, and determines the received position information of the position of the service station (operation S507). Then, the server 10 detects fuel price information and availability information from the captured image on the premise that the position of the service station has been determined (operation S508) and stores the detected information as the service station information 23 in the storage unit 21. In this modified example, when captured image data which is arbitrarily imaged by a user is transmitted to the server 10, service station information can be detected from the captured image data having a high likelihood that it will be a captured image of a service station by checking whether the imaging position matches the location of the service station on the map, and thus it is possible to skip unnecessary processes.

Figure 8:
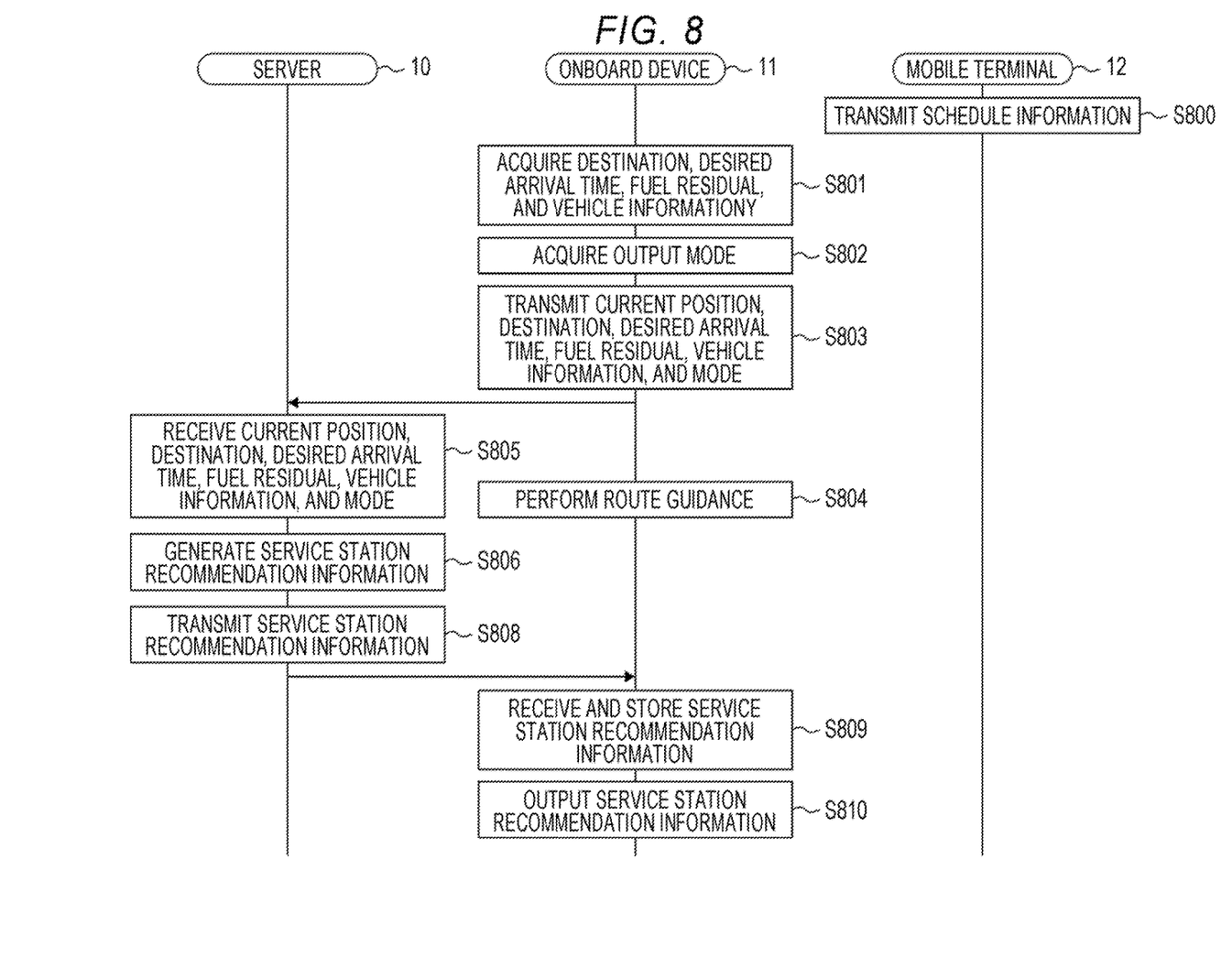
FIG. 8 is a sequence diagram illustrating operations of the information providing system.

FIG. 8 is a sequence diagram illustrating the operations of the information providing system 1 when the onboard device 11 presents service station recommendation information. The sequence illustrated in FIG. 8 is performed when a user starts the onboard device 11.

The onboard device 11 acquires a destination or a desired arrival time in addition to the destination (operation S801). In the onboard device 11, the navigation unit 35 acquires the destination or the like, for example, when a user inputs the destination or the like to the navigation unit 35 via the input and output unit 30. In the onboard device 11, for example, the control unit 36 acquires a fuel (power source) residual from the vehicle state detecting unit 33 and acquires the vehicle information 38 from the storage unit 32. For example, by causing the mobile terminal 12 to transmit schedule information 46 of a user (operation S800) and causing the navigation unit 35 to receive the schedule information 46, the onboard device 11 may acquire a destination or a desired arrival time from scheduled visit place information and scheduled visit date and time information which are included in the schedule information 46.

Then, the onboard device 11 acquires an output mode (operation S802). The output mode is a mode indicating a user's preference in outputting service station information. The output mode includes, for example, a price priority mode and a required time preferred mode, but is not limited thereto. In the onboard device 11, the control unit 36 acquires the output mode, for example, by allowing a user to select or input the output mode via the input and output unit 30.

The onboard device 11 transmits the current position of the vehicle 14, the destination, the desired arrival time, the fuel residual, the vehicle information, and the output mode to the server 10 (operation S803). The control unit 36 acquires GPS signals from the communication unit 31 and detects the current position from the GPS signals. Then, in the onboard device 11, the navigation unit 35 starts route guidance from the current position to the destination (operation S804).

In the onboard device 11, the units that perform operations S801, S802, and S803 correspond to a "condition setting unit."

The server 10 receives the current position of the vehicle 14, the destination, the desired arrival time, the fuel residual, the vehicle information, and the output mode from the onboard device 11 (operation S805), generates service station recommendation information based on the destination, the desired arrival time, the fuel residual, and the output mode (operation S806), and transmits the service station recommendation information to the onboard device 11 (operation S808). In the server 10, the units that perform operations S805, S806, and S808 correspond to a "power source station recommendation information providing unit."

For example, the control unit 22 reads the service station information 23 from the storage unit 21 and extracts service station information of service stations in the vicinity of a travel route of the vehicle 14, for example, service stations of which the positions are within a predetermined range from the current position. The predetermined range is, for example, a range in which the vehicle 14 can reach with the fuel residual. For example, the control unit 22 retrieves the fuel efficiency of the vehicle 14 with reference to a database in which fuel efficiency, a fuel type which can be supplied, and a fuel tank capacity are correlated with the vehicle information and which is stored in advance in the storage unit 21. Then, the control unit 22 calculates a distance at which the vehicle 14 can arrive with the fuel residual received from the vehicle 14 based on the retrieved fuel efficiency of the vehicle 14.

Then, the control unit 22 prioritizes the extracted service station information based on the output mode and generates service station recommendation information.

For example, when the output mode is a price priority mode, the control unit 22 prioritizes the extracted service station information in ascending order of fuel prices which are predicted to be paid and generates the service station recommendation information. For example, the control unit 22 calculates a total sum of money when the vehicle 14 is charged with fuel to the full state of charge using the fuel price of the fuel type appropriated for the vehicle 14 for each piece of service station information. For example, the control unit 22 acquires a fuel tank capacity of the vehicle 14 from the storage unit 21 and calculates an amount of fuel supplied for the full state of the tank from a difference between the fuel residual and the fuel tank capacity. Then, the control unit 22 subtracts a discount quantity based on the discount condition corresponding to the day or the date from the calculated total sum of money, calculates a final total sum of money, and prioritizes the service station information in ascending order of the total prices.

For example, when the output mode is a required time priority mode, the control unit 22 prioritizes the extracted service station information in the ascending time of the required times to the destination when the vehicle stops at the service station, and generates service station recommendation information. For example, the control unit 22 calculates a required time for the vehicle 14 to reach the destination via the service station from the current position thereof based on a predetermined average travel speed (for example, a speed limit of a route) for each service station. Alternatively, the onboard device 11 may transmit a vehicle speed along with the destination or the like to the server 10 and the control unit 22 may calculate the required time using the vehicle speed. At this time, the control unit 22 may add a predetermined time (for example, 10 to 15 minutes) in which the vehicle is predicted to stay at the service station.

In the price priority mode, when the total sums of money which are required for purchase of fuel in a plurality of pieces of service station information are the same, the control unit 22 may prefer the service station having the shorter required time for arriving at the destination via the service station. In the required time priority mode, when the required times in the plurality of pieces of service station information are the same, the control unit 22 may prefer the service station having the lower total sum for purchase of fuel. In any mode, the control unit 22 may exclude a service station in which a scheduled time at which the vehicle arrives at the destination in the calculated required time exceeds the desired arrival time from the service station recommendation information.

Subsequently, the server 10 transmits the generated service station recommendation information to the onboard device 11 (operation S808). The onboard device 11 receives the service station recommendation information and stores the received service station recommendation information in the storage unit 32 (operation S809). Then, the onboard device 11 outputs the service station recommendation information (operation S810). In the onboard device 11, for example, the control unit 36 outputs the service station recommendation information as an image to the panel display of the input and output unit 30.

Figure 9:
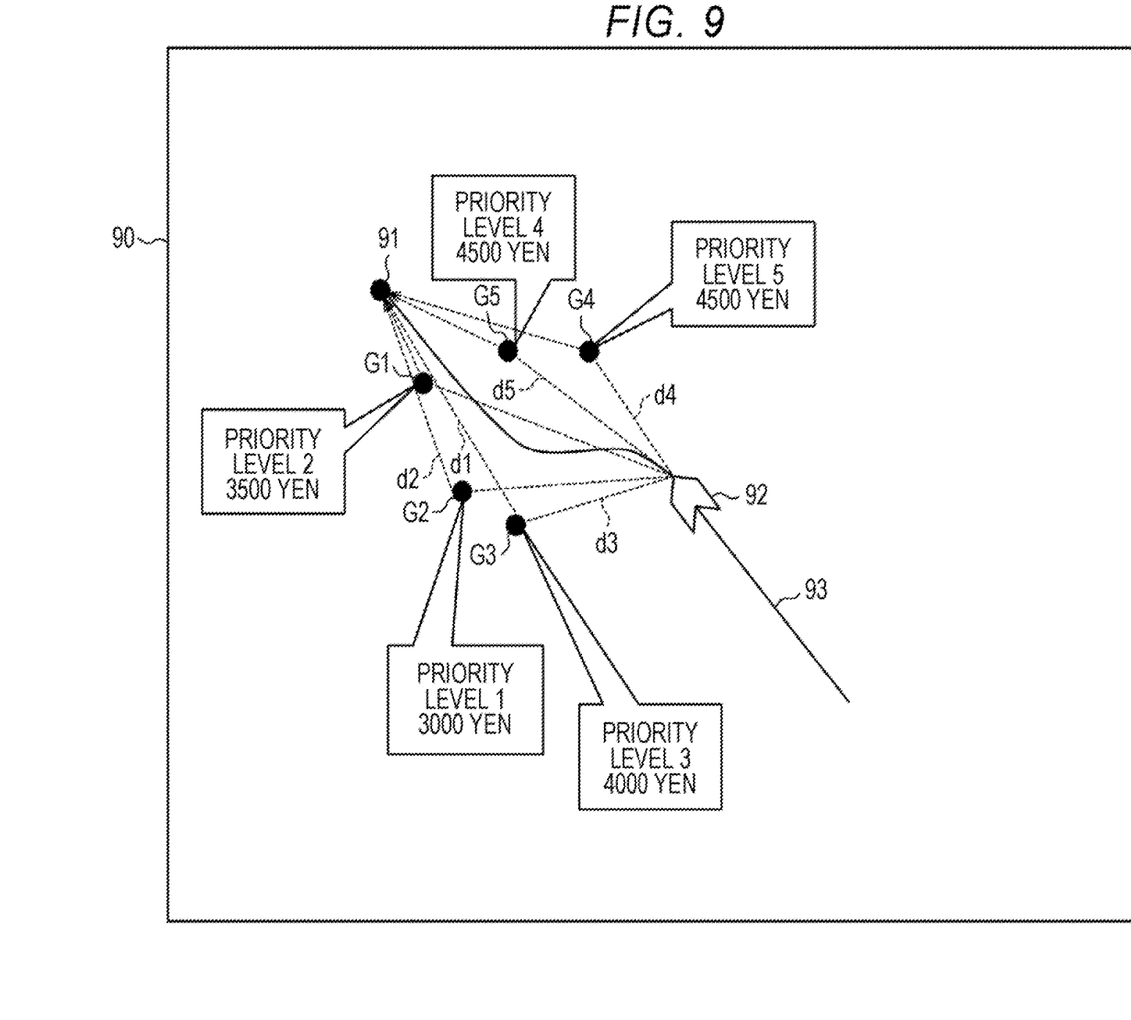
FIG. 9 is a diagram illustrating an example of an output mode of service station recommendation information.

FIG. 9 illustrates an example of a display mode of the service station recommendation information in the price priority mode. On a route guidance screen 90, a destination 91, a current position 92, and a route 93 are displayed on a map. On the route guidance screen 90, service stations G1 to G5 which are extracted within a predetermined range from the current position 92 are displayed along with priority levels and fuel prices. Here, for the purpose of convenience of explanation, time distances d1 to d5 corresponding to required times from the current position 92 to the destination 91 when the vehicle is fueled at the service stations are indicated by dotted lines.

For example, since the service station G2 among the extracted service stations G1 to G5 has a lowest fuel price "3000 yen," priority level "1" is given to the service station G2. Since the service station G1 has a second lowest fuel price "3500 yen," priority level "2" is given to the service station G1. Since the service station G3 has a third lowest fuel price "4000 yen," priority level "3" is given to the service station G1. Then, since the service stations G4 and G5 have a fourth lowest fuel price "4500 yen" but the time distance d5 corresponding to the service station G5 is shorter than the time distance d4 corresponding to the service station G4, priority level "4" is given to the service station G5 and priority level "5" is given to the service station G4. Here, for example, the time distances d1 to d5 corresponding to the service stations G1 to G5 satisfy d1<d5<d4<d2≤d3 (d2=d3). On the other hand, the priority levels in the price priority mode satisfy G2>G1>G3>G4>G5. In this way, the priority levels are given in ascending order of fuel prices instead of using the total required time to the destination 91. In this way, in the price priority mode, more comprehensive information of service stations can be provided to a user in ascending order of fuel prices, thereby contributing to convenience.

Figure 10:
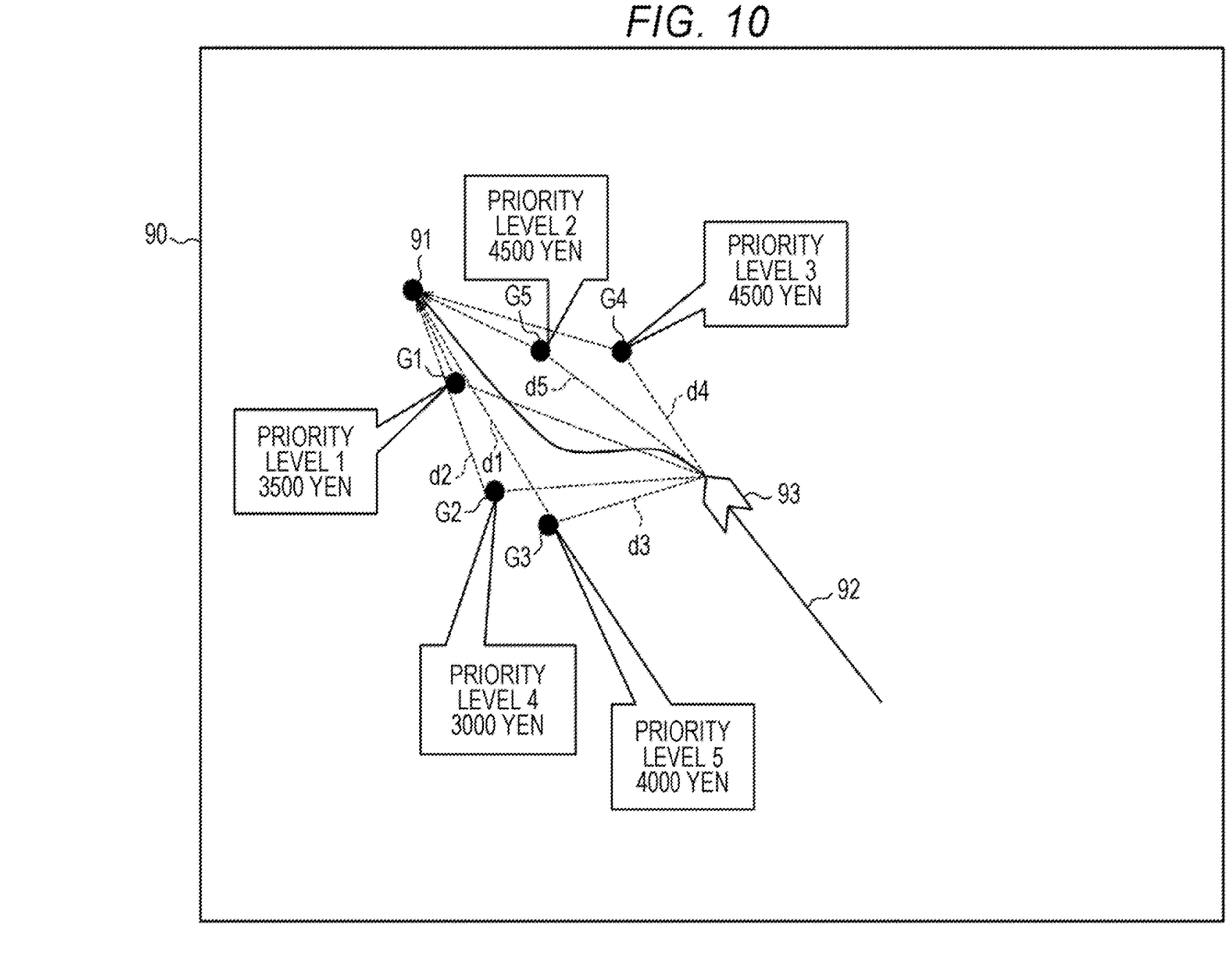
FIG. 10 is a diagram illustrating an example of an output mode of service station recommendation information.

FIG. 10 illustrates an example of a display mode of the service station recommendation information in the required time priority mode. Similarly to FIG. 9, a destination 91, a current position 92, and a route 93 are displayed on a route guidance screen 90 and service stations G1 to G5 which are extracted within a predetermined range from the current position 92 are displayed along with priority levels and fuel prices. For example, the time distances d1 to d5 indicating the required times corresponding to the service stations G1 to G5 satisfy d1<d5<d4<d2<d3 (d2=d3). Accordingly, the priority levels are given in ascending order of the required times. That is, priority level "1" is given to the service station G1, priority level "2" is given to the service station G5, and priority level "3" is given to the service station G4. Since the total required times of the service station G2 and the service station G3 are the same, the service station G2 having the lower fuel price has priority, priority level "4" is given to the service station G2, and priority level "5" is given to the service station G3. Here, the fuel price ascends in the order of G4, G1, G3, G4, and G5. On the other hand, the priority level in the required time priority mode becomes higher in the order of G1, G5, G4, G2, and G3. In this way, the priority levels are given in ascending order of the total required times instead of ascending order of the fuel prices. In this way, in the required time priority mode, more comprehensive information of the service stations can be provided to a user in ascending order of the required times, thereby contributing to convenience.

In any of the price priority mode and the required time priority mode, an availability state of each service station, for example, "there is availability," "there is much availability," "there is little availability," "there is no availability," or an imaging time in addition to the availability state can be displayed. Accordingly, predictability for a waiting time for fueling can be provided to a user.

As the display mode of the priority levels, various display modes such as ranking using characters such as "A, B, C," ranking using sizes of characters, and ranking using sizes of icons indicating service stations on a map can be used in addition to the order of numerals as illustrated in FIGS. 9 and 10. When priority levels have only to be displayed, fuel prices are not necessarily displayed. The input and output unit 30 may sequentially output the priority levels and the fuel prices of the service stations, for example, by voices based on the priority levels. In any of the price priority mode and the required time priority mode, a plurality of service stations having the same fuel price and the same required time can be arbitrarily prioritized. For example, regarding availability states of the service stations, the higher degree of availability may be preferred. When a plurality of service stations has the same degree of availability, the service station having an imaging time closer to the current time may be preferred. Accordingly, it is possible to improve convenience for a user.

For example, when a user selects a recommended service station on a screen, the navigation unit 35 can perform route guidance to the selected service station in response thereto. As described above, according to this embodiment, it is possible to improve convenience for a user in providing information of service stations.

While an embodiment of the disclosure has been described above with reference to the drawings, those skilled in the art should note that the disclosure can be modified or corrected in various forms based on this disclosure. Accordingly, it should be noted that the modifications and corrections belong to the scope of the disclosure. For example, the functions included in the units or the steps can be rearranged without logical inconsistency and a plurality of units or steps may be combined into one unit or step or may be divided.

For example, in the above-mentioned embodiment, some of the elements and the functions of the server 10 may be included in another device. For example, some of the elements and the functions of the server 10 may be included in the onboard device 11. For example, the onboard device 11 or the mobile terminal 12 may extract service station information including fuel prices and availability from captured image data and transmit the extracted service station information to the server 10. Accordingly, it is possible to distribute a process load of the server 10.

When the vehicle 14 is a hybrid vehicle or an electric vehicle which has electric power charged in an onboard battery as a power source and travels with power based on the electric power, the power source station may be a power supply station. When the vehicle 14 is a fuel-cell vehicle which acquires power from electric power generated by a fuel cell and travels, the power source station may be, for example, a hydrogen station that supplies hydrogen fuel serving as a power source which is supplied to the fuel cell. In the above-mentioned embodiment, an example in which the power source is petroleum fuel has been described, but power source stations of petroleum fuel, electric power, or hydrogen fuel may be stored in the server 10. Then, the server 10 may detect with which power source the vehicle 14 is to be supplied from the vehicle information 38 and provide power source station recommendation information based on the power source in the price priority mode or the required time priority mode.

The network 13 in this embodiment includes an ad hoc network, a local area network (LAN), a metropolitan area network (MAN), a cellular network, a wireless personal area network (WPAN), a public switched telephone network (PSTN), a terrestrial wireless network, an optical network, another network, or a combination of some thereof in addition to the above-mentioned examples. Examples of elements of a wireless network include an access point (for example, a Wi-Fi access point) and a femtocell. A wireless communication device can be connected to a wireless network using Wi-Fi (registered trademark), Bluetooth (registered trademark), cellular communication techniques, or other radio techniques and technical standards.

In this way, various aspects of the present disclosure can be embodied in many different embodiments and such embodiments are included in the scope of the embodiment.

What is claimed is:

1. An information providing system comprising an onboard device and a server configured to transmit information to and receive information from the onboard device, wherein
    the onboard device includes:
        one or more first processors configured to acquire a current position and an output mode and to transmit the acquired current position and the acquired output mode to the server; and
        an output interface configured to output recommendation information of a power source station which is received from the server, and
    the server includes:
        one or more memories configured to store information of the power source station including position information of the power source station and a power source price which is detected from a captured image of the power source station; and
        one or more second processors configured to
            prioritize power source stations which are located within a predetermined range from the current position based on the output mode and to provide information of the prioritized power source stations as the recommendation information of the power source station to the onboard device,
            receive the captured image data from a mobile terminal,
            extract the power source price information from the captured image data which is received from the mobile terminal, and
            generate the information of the power source station including the power source price information and position information corresponding to the captured image data.

2. The information providing system according to claim 1, wherein
    the output mode is a price priority mode, and
    the one or more second processors are configured to prioritize the power source stations in ascending order of power source prices.

3. The information providing system according to claim 1, wherein
    the output mode is a required time priority mode, and
    the one or more second processors are configured to prioritize the power source stations in ascending order of required times based on the current position of the onboard device and a destination acquired from the onboard device.

4. The information providing system according to claim 1, wherein
    the one or more second processors are configured to detect availability of each power source station from the captured image data and to generate the power source station information including the availability.

5. The information providing system according to claim 1, wherein the mobile terminal is connected to the onboard device via a wireless connection.

6. The information providing system according to claim 1, wherein the mobile terminal is connected to the onboard device via a wired connection.

7. A server comprising:
    one or more communication modules configured to transmit information to and receive information from an onboard device or a mobile terminal; and
    one or more processors configured to
        acquire captured image data which is transmitted from the mobile terminal and position information corresponding to the captured image data, to extract a power source price from the captured image data,
        generate information of the power source station including the power source price and the position information,
        acquire a current position and an output mode which are transmitted from the onboard device,
        prioritize power source stations which are located within a predetermined range from the current position based on the output mode,
        provide information of the prioritized power source stations as recommendation information of the prioritized power source station to the onboard device.

8. The server according to claim 7, wherein
    the output mode is a price priority mode, and
    the one or more processors are configured to prioritize the power source stations in ascending order of power source prices.

9. The server according to claim 7, wherein
    the output mode is a required time priority mode, and
    the one or more processors are configured to prioritize the power source stations in ascending order of required times based on the current position of the onboard device and a destination acquired from the onboard device.

10. An information providing method which is performed by an onboard device and a server configured to transmit information to and receive information from the onboard device, the information providing method comprising:

storing, by the server, information of power source stations including position information of the power source stations and power source price information which are detected from captured images of the power source stations that are captured by a mobile terminal;
acquiring, by the onboard device, a current position and an output mode and to transmit the acquired current position and the acquired output mode to the server;
prioritizing, by the server, power source stations which are located within a predetermined range from the current position based on the output mode and to provide information of the prioritized power source stations as recommendation information of the power source stations to the onboard device;
generating, by the server, the information of the power source stations including the power source price information and position information corresponding to the captured image data; and
outputting, by the onboard device, the recommendation information of the power source stations which is received from the server.

11. The information providing method according to claim 10, wherein
the output mode is a price priority mode, and
the server is configured to prioritize the power source stations in ascending order of power source prices.

12. The information providing method according to claim 11, further comprising:
extracting, by the server, power source price information from captured image data which is received from the mobile terminal; and
generating, by the server, the information of the power source stations including the power source price information and position information corresponding to the captured image data.

13. The information providing method according to claim 10, wherein
the output mode is a required time priority mode, and
the server is configured to prioritize the power source stations in ascending order of required times based on the current position of the onboard device and a destination acquired from the onboard device.

14. The information providing method according to claim 13, further comprising:
extracting, by the server, power source price information from captured image data which is received from the mobile terminal; and
generating, by the server, the information of the power source stations including the power source price information and position information corresponding to the captured image data.

15. The information providing method according to claim 10, further comprising:
extracting, by the server, power source price information from captured image data which is received from the mobile terminal; and
generating the information of the power source stations including the power source price information and position information corresponding to the captured image data.

16. The information providing method according to claim 15, wherein
the server is configured to detect availability of each power source station from the captured image data and to generate the information of the power source stations including the availability.

17. The information providing method according to claim 10, further comprising:
detecting, by the mobile terminal, a current position of the mobile terminal; and
outputting, by the mobile terminal, a notification for prompting a user to capture an image of the power source station when detecting that the current position is located at a predetermined distance from a power source station.

* * * * *